(12) United States Patent
Watanabe et al.

(10) Patent No.: US 8,349,995 B2
(45) Date of Patent: Jan. 8, 2013

(54) POLYTHIOCARBONATEPOLY(THIO)EPOXIDE

(75) Inventors: Masanori Watanabe, Ube (JP); Takafumi Hirakawa, Ube (JP); Atsushi Morikami, Ube (JP); Yasushi Nakamoto, Ube (JP)

(73) Assignee: UBE Industries, Ltd., Ube-Shi (JP)

( * ) Notice: Subject to any disclaimer, the term of this patent is extended or adjusted under 35 U.S.C. 154(b) by 743 days.

(21) Appl. No.: 12/092,074

(22) PCT Filed: Oct. 27, 2006

(86) PCT No.: PCT/JP2006/321554
§ 371 (c)(1),
(2), (4) Date: Jul. 27, 2009

(87) PCT Pub. No.: WO2007/052567
PCT Pub. Date: May 10, 2007

(65) Prior Publication Data
US 2009/0299030 A1    Dec. 3, 2009

(30) Foreign Application Priority Data

Oct. 31, 2005 (JP) ................................ 2005-316757

(51) Int. Cl.
*C08G 75/04* (2006.01)
(52) U.S. Cl. .................. 528/374; 528/370; 528/380
(58) Field of Classification Search .................. 528/374, 528/380, 370
See application file for complete search history.

(56) References Cited

U.S. PATENT DOCUMENTS

| | | | |
|---|---|---|---|
| 6,117,923 A | 9/2000 | Amagai et al. | |
| 2003/0171533 A1* | 9/2003 | Tamura et al. | 528/377 |

FOREIGN PATENT DOCUMENTS

| | | |
|---|---|---|
| EP | 0 425 049 A2 | 5/1991 |
| JP | 60-199016 | 10/1985 |
| JP | 05-148340 | 6/1993 |
| JP | 1997-071580 | 3/1997 |
| JP | 1997-110979 | 4/1997 |
| JP | 09-255781 | 9/1997 |
| JP | 11-258402 | 9/1999 |
| JP | 11-322930 | 11/1999 |
| JP | 2000/053761 | 2/2000 |
| JP | 2002-201277 | 7/2002 |
| JP | 2003/176358 | 6/2003 |
| JP | 2005-029608 | 2/2005 |
| JP | 2005-031175 | 2/2005 |
| JP | 2005/336476 | 12/2005 |

OTHER PUBLICATIONS

Montaudo et al. (J. of Poly. Sci., Part A: Poly. Chem., 27, 2277-2290).*
Montaudo et al., J. of Poly. Sci., Part A: Poly. Chem., 27, 2277-2290, 1989.*
Supplementary European Search Report dated Nov. 19, 2009 issued in European Patent Application No. EP 06 82 2515, filed Oct. 27, 2006.
Marianucci et al., "Refractive index of poly(thiocarbonate)s and poly(dithiocarbonate)s," *Polymer*, (1994) 35(7):1564-1566.
Pilati et al., "Aliphatic poly(dithiocarbonate)s: synthesis and thermal properties," *Polymer Communications*, (1990) 31:431-433.
International Preliminary Report on Patentability and Written Opinion issued on May 15, 2008 in PCT Application No. PCT/JP2006/321554, dated Oct. 27, 2006.
International Search Report mailed on Jan. 23, 2007 in PCT/JP2006/321555, filed Oct. 27, 2006.
Written Opinion dated Jan. 23, 2007 issued in PCT/JP2006/321555, filed Oct. 27, 2006.
International Preliminary Report on Patentability mailed on May 6, 2008 issued in PCT/JP2006/321555, filed Oct. 27, 2006.
Extended European Search Report dated Nov. 19, 2009 issued in European Patent Application No. EP 06 82 2516, filed Oct. 27, 2006.
International Search Report mailed on Jan. 23, 2007 in PCT/JP2006/321554, filed Oct. 27, 2006.
Written Opinion dated Jan. 23, 2007 issued in PCT/JP2006/321554, filed Oct. 27, 2006.

* cited by examiner

*Primary Examiner* — Shane Fang
(74) *Attorney, Agent, or Firm* — Knoobe Martens Olson & Bear LLP

(57) ABSTRACT

Disclosed is a polythiocarbonate poly(thio)epoxide in which a hydrogen atom in a mercapto group of a polythiocarbonate polythiol is substituted with a (thio)epoxy-containing group. By using this compound as a starting material, there can be obtained a polythioether or a sulfur-containing polyether having, in addition to excellent optical properties (a high refractive index and a high Abbe's number), excellent mechanical properties (a high bending distortion) and a high glass transition temperature.

16 Claims, No Drawings

POLYTHIOCARBONATEPOLY(THIO)EPOXIDE

CROSS REFERENCE TO RELATED APPLICATION

This application claims the benefit and priority to and is a U.S. National Phase of PCT International Application Number PCT/JP2006/321554, filed on Oct. 27, 2006, designating the United States of America, which claims priority under 35 U.S.C. §119 to Japanese Application Number 2005-316757 filed on Oct. 31, 2005. The disclosures of the above-described applications are hereby incorporated by reference in their entirety.

TECHNICAL FIELD

The present invention relates to a polythiocarbonate poly(thio)epoxide where a hydrogen atom in a mercapto group is substituted with a (thio)epoxy-containing group. Such a polythiocarbonate poly(thio)epoxide is useful as a starting material for resins for optical application, and a resin obtained has excellent optical properties and excellent mechanical properties, and thus will be applicable to, for example, a plastic lens, a prism, an optical fiber, an information storage substrate, a color filter and an infrared absorbing filter. As used herein, a polythiocarbonate means a poly(thiocarbonate) having a thiocarbonate structure as a repeating unit, and a (thio)epoxy and a (thio) ether mean epoxy or thioepoxy and ether or thioether; respectively (the same shall apply hereinafter).

BACKGROUND ART

Recently as optical materials, plastics have been predominantly used because they are light-weight and resistant to fracture in comparison with glasses and readily stainable. For example, polyethyleneglycolbisallyl carbonates, polymethyl methacrylates, alicyclic polyolefins and polycarbonates have been commonly used as an optical resin. However, these have a refractive index of 1.6 or less, so that when they are used for coating or bonding of a material having a high refractive index, the intrinsic properties of the object adhered cannot be fully utilized and furthermore, when they are used for, for examples a lens, a lens thickness becomes larger. Since a plastic having a higher refractive index generally tends to have a lower Abbe's number and a larger chromatic aberration, an observed object looks tinted and blurred. Thus, a plastic having a high refractive index and a high Abbe's number has been needed as an optical resin. When being used for, for example, a lens, a plastic must be furthermore resistant to deformation within use temperature range, and a plastic for an optical use is, therefore, additionally needed to have a high glass transition temperature.

As such an optical resin, there have been proposed ring-opening polymers of a polyepisulfide compound in, for example, Patent documents 1 and 2. However, such a polymer having a higher glass transition temperature tends to have a smaller bending distortion, leading to its fragility, and, therefore, there has been a resin having a high refractive index, a high Abbe's number and furthermore a high glass transition temperature which is endowed with flexibility to a bending stress.

Furthermore, Patent document 3 has proposed a polythioether or sulfur-containing polyether as a ring-opening polymer of a poly(thio)epoxy compound having a trithiocarbonate moiety. This polymer is, however, unsatisfactory because it has insufficient flexibility to a bending stress and the poly(thio)epoxy compound has in adequate hue (APHA of considerably larger than 200) in the light of transparency.

Furthermore, Patent documents 4 to 6 and Non-Patent documents 1 and 2 have proposed, as an optical resin, a polythiocarbonate prepared by reacting an aliphatic (including alicyclic) dithiol and phosgene. However, this polymer has a chlorine atom at a molecular terminal and has a higher melting point, which become drawbacks when the polymer is to be further used a starting material for an optical resin by melt molding or cast polymerization. In terms of a practical manufacturing process, there is a problem that a highly toxic phosgene is used.

Patent document 1: Japanese Laid-open Patent Publication No. 1997-71580;
Patent document 2: Japanese Laid-open Patent Publication No. 1997-110979;
Patent document 3: Japanese Laid-open Patent Publication No. 2000-53761;
Patent document 4: Japanese Laid-open Patent Publication No. 2002-201277;
Patent document 5: Japanese Laid-open Patent Publication No. 2005-29608;
Patent document 6: Japanese Laid-open Patent Publication No. 2005-31175;
Non-Patent document 1: POLYMER, 35, 7, 1564 (1994);
Non-Patent document 2: POLYMER COMMUNICATIONS, 1990, 31, 431

DISCLOSURE OF THE INVENTION

Subject to be Solved by the Invention

An objective of the present invention is to provide a starting material for an optical resin which solves the above problems for a polythioether or sulfur-containing polyether and can provide a polythioether or sulfur-containing polyether meeting the properties required for an optical resin. Another objective of the present invention is to provide a polythioether or sulfur-containing polyether having, in addition to excellent optical properties (a high refractive index and a high Abbe's number), excellent mechanical properties (a high bending distortion) and a high glass transition temperature.

Means to Solve the Subject after intense investigation for solving the above problems, we have finally found novel polythiocarbonate poly(thio)epoxides and have found that a ring-opening polymer (polythiocarbonate poly(thio)ether) prepared using it as a starting material has the above properties, and thus accomplished the present invention.

The present invention relates to the followings.

[1] A polythiocarbonate poly(thio)epoxide wherein a hydrogen atom of a mercapto group in a polythiocarbonate polythiol is substituted with a (thio)epoxy-containing group.

[2] The polythiocarbonate poly(thio)epoxide as described in [1], wherein said (thio)epoxy-containing group is a β-(thio) epoxypropyl group.

[3] The polythiocarbonate poly(thio)epoxide as described in [1] or [2], comprising a repeating unit represented by general formula (1):

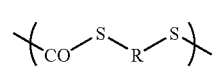

(1)

wherein R is a divalent hydrocarbon group which may optionally have a substituent uninvolved in the reaction and whose carbon chain may optionally have an atom or atomic group uninvolved in the reaction.

[4] The polythiocarbonate poly(thio)epoxide as described in [3], represented by general formula (2):

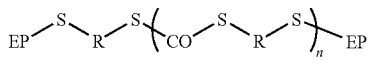 (2)

wherein EP represents a β-(thio)epoxypropyl group and n represents an integer of 1 or more.

[5] The polythiocarbonate poly(thio)epoxide as described in [3] or [4], comprising at least two types of the repeating units represented by general formula (1).

[6] The polythiocarbonate poly(thio)epoxide as described in any one of [1] to [5], having a number average molecular weight of 400 to 3000.

[7] The polythiocarbonate poly(thio)epoxide as described in any one of [1] to [6], having an APHA of 150 or less.

[8] A process for manufacturing a polythiocarbonate polyepoxide wherein a hydrogen atom of a mercapto group in a polythiocarbonate polythiol is substituted with an epoxy-containing group; the process comprising a step of reacting a polythiocarbonate polythiol with an epoxy-containing halogenated hydrocarbon compound.

[9] The process for manufacturing a polythiocarbonate polyepoxide as described in [8], wherein said epoxy-containing halogenated hydrocarbon compound is a β-epoxypropyl halide compound.

[10] A process for manufacturing a polythiocarbonate polythioepoxide wherein a hydrogen atom of a mercapto group in a polythiocarbonate polythiol is substituted with a thioepoxy-containing group; the process comprising a step of reacting a polythiocarbonate polyepoxide in which a hydrogen atom of a mercapto group in a polythiocarbonate polythiol is substituted with an epoxy-containing group with a sulfating agent.

[11] A polymerizable composition comprising the polythiocarbonate poly(thio)epoxide as described in any one of [1] to [7].

[12] The polymerizable composition as described in [11], comprising a compound having a functional group capable of reacting a (thio)epoxy group to open the ring.

[13] The polymerizable composition as described in [12], wherein said compound having a functional group capable of reacting a (thio)epoxy group to open the ring is a mercapto-containing compound.

[14] The polymerizable composition as described in any one of [11] to [13], further comprising a poly(thio)epoxide compound other than said polythiocarbonate poly(thio)epoxide.

[15] A polymer prepared by polymerizing the polymerizable composition as described in any of [11] to [14].

[16] An optical material comprising the polymer as described in [15].

Effect of the Invention

By using a compound of the present invention as a starting material for an optical resin, the requirement for the properties of an optical resin can be met; that is, there can be prepared a polythioether or sulfur-containing polyether (that is, a polythiocarbonate poly(thio)ether) having excellent optical properties (a high refractive index and a high Abbe's number) as well as excellent mechanical properties (a high bending distortion) and a high glass transition temperature.

BEST MODE FOR CARRYING OUT THE INVENTION

There will be detailed the present invention. A polythiocarbonate poly(thio)epoxide of the present invention is a compound in which a hydrogen atom of a mercapto group in a polythiocarbonate polythiol is substituted with a (thio)epoxy-containing group. That is, it is a poly(thiocarbonate) having a thiocarbonate structure as a repeating unit and having a (thio)epoxy-containing group at the terminal of a mercapto group. As described later, among others, that in which a hydrogen atom of a mercapto group is substituted with an epoxy-containing group, i.e. a polythiocarbonate polyepoxide, can be prepared by reacting a polythiocarbonate polythiol with an epoxy-containing halogenated hydrocarbon compound, and that in which a hydrogen atom of a mercapto group is substituted with a thioepoxy-containing group, i.e. a polythiocarbonate polythioepoxide, can be prepared by reacting the polythiocarbonate polyepoxide with a sulfating agent.

Polythiocarbonate Polythiol

The polythiocarbonate polythiol as a starting material is preferably prepared by a transesterification reaction between a carbonate compound (a carbonate component) and a polythiol compound (a thiol component) in the presence of a transesterification catalyst. A typical synthetic reaction scheme is as follows.

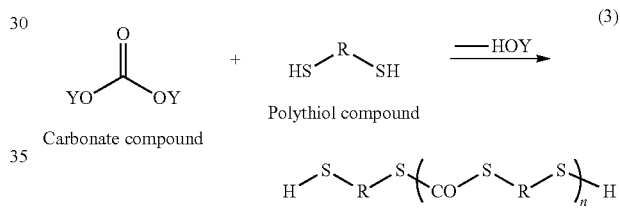 (3)

This scheme illustrates a case where R in the polythiol compound is a divalent hydrocarbon group.

Examples of the above carbonate compound include dialkyl carbonates such as dimethyl carbonate, diethyl carbonate, di-n-butyl carbonate and diisobutyl carbonate; diaryl carbonates such as diphenyl carbonate; alkylene carbonates such as ethylene carbonate and propylene carbonate; and alkylaryl carbonates such as methylphenyl carbonate. Among these carbonate compounds, diaryl carbonates are preferable; diphenyl carbonate is particularly preferable.

The polythiol compound may be one or more polythiol compounds corresponding to the polyol compound used in the preparation of the polycarbonate polyol; specifically, it may be a compound where a mercapto group is attached to a free terminal of a polyvalent (at least, divalent) hydrocarbon group (preferably having 2 to 14 carbon atoms). This hydrocarbon group may be, for example, an aliphatic (including an alicyclic) hydrocarbon group (preferably having 2 to 14 carbon atoms) or an aromatic (including an arylaliphatic) hydrocarbon group (preferably having 6 to 14 carbon atoms) and may have a substituent (for example, an alkyl group and an alkoxy group) uninvolved in the reaction, and may contain, in its carbon chain, an atom or atomic group uninvolved in the reaction such as a heteroatom (for example, oxygen, sulfur or nitrogen) and a ring structure (for example, an alicyclic structure, an aromatic ring structure or a heterocycle). As used herein, the term "uninvolved in the reaction" means that they do not participate in a reaction for synthesizing a polythiocarbonate polythiol, a reaction for synthesizing a polythiocarbonate poly(thio)epoxide or a reaction or synthesizing a polythiocarbonate poly(thio)ether.

The polyvalent hydrocarbon groups are preferably divalent or more and octavalent or less, more preferably pentavalent or less, particularly preferably divalent. Among these, preferred are aliphatic, particularly divalent aliphatic hydrocarbon groups. The heteroatom is preferably sulfur or oxygen, and the ring structure is preferably an alicyclic structure or a saturated heterocyclic structure. When the polyvalent hydrocarbon group is a divalent hydrocarbon group, the polythiocarbonate polythiol is a polythiocarbonate dithiol having a repeating unit represented by the above-mentioned general formula (1), where "R" in general formula (1) corresponds to this hydrocarbon group. In addition, the repeating unit represented by general formula (1), as it is, becomes a repeating unit in a polythiocarbonate poly(thio)epoxide of the present invention. When the hydrocarbon group is trivalent or more, branched and/or crosslinked structures in a polymer increase, and it is, therefore, preferable to select the valency, taking the physical properties of a polythiocarbonate poly(thio)ether obtained into account. The content of tri- or higher valent hydrocarbon groups, if present, is preferably 30 mol % or less, more preferably 20% or less to the total amount of polyvalent hydrocarbon groups.

For example, when a single molecule has a divalent hydrocarbon group $R^1$ and a trivalent hydrocarbon group $R^2$, a polythiocarbonate polythiol has a branched structure (4) at the hydrocarbon group $R^2$, for example, as illustrated below.

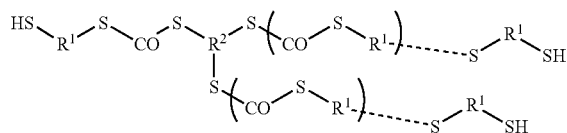

(4)

Examples of a polythiol compound in which the hydrocarbon group is an aliphatic hydrocarbon group, include alkanedithiols such as 1,2-ethanedithiol, 1,3-propane dithiol, 1,4-butanedithiol 1,5-pentanedithiol, 1,6-hexanedithiol, 1,7-heptanedithiol 1,8-octanedithiol, 1,9-nonanedithiol 1,10-decanedithiol, 1,12-dodecanedithiol, 2,2-dimethyl-1,8-propane dithiol, 3-methyl-1,5-pentanedithiol, 2-methyl-1,8-octanedithiol; cycloalkanedithiols such as 1,4-cyclohexanedithiol;

alkanedithiols whose carbon chain contains a heteroatom such as bis(2-mercaptoethyl) ether, bis(2-mercaptoethyl) sulfide, bis(2-mercaptoethyl) disulfide and 2,2'-(ethylenedithio) diethanethiol; alkanedithiols whose carbon chain contains an alicyclic structure such as 1,4-bis(mercaptomethyl)cyclohexane; alkanedithiols whose carbon chain contains a heteroatom and an alicyclic structure such as 2,5-bis(mercaptomethyl)-1,4-dioxane and 2,5-bis(mercaptomethyl)-1,4-dithiane;

alkanetrithiols such as 1,1,1-tris(mercaptomethyl)ethane, 2-ethyl-2-mercaptomethyl-1,3-propane dithiol and 1,8-mercapto-4-mercaptomethyl-3,6-thiaoctane; and alkanetetrathiols such as tetrakis(mercaptomethyl)methane, 3,3'-thiobis (propane-1,2-dithiol) and 2,2'-thiobis(propane-1,3-dithiol).

Examples of a polythiol compound in which the hydrocarbon group is an aromatic hydrocarbon group include aromatic dithiols such as 1,2-benzenedithiol, 1,3-benzenedithiol, 1,4-benzenedithiol and toluene-3,4-dithiol; arylaliphatic dithiols such as 1,2-bis(mercaptomethyl)benzene, 1,3-bis(mercaptomethyl)benzene and 1,4-bis(mercaptomethyl)benzene; and aromatic trithiols such as 1,3,5-benzenetrithiol and 1,3,5-tris (mercaptomethyl)benzene.

In the present invention, polythiol compounds may be used alone or in combination of two or more (at least two). When the polyvalent hydrocarbon group in the polythiol compound is a divalent hydrocarbon group and a plurality types of the polythiol compounds are used, a polythiocarbonate polythiol obtained is a copolymer in which R has a plurality types (at least two types) of repeating units in general formula (1). Here, for example, when using the following combinations of the polythiol compounds, a polythiocarbonate polythiol can be obtained, which has a low melting point and a low crystallization temperature and which is a liquid at room temperature (40° C. or lower, preferably 30° C. or lower, in particular embodiments 20° C. or lower, more preferably 10° C. or lower). There are no particular restrictions to a ratio of the plurality of the polythiol compounds as long as a polythiocarbonate polythiol which is a liquid at room temperature can be obtained. The use of a liquid polythiocarbonate polythiol as a starting material is practically very useful because a polythiocarbonate poly(thio)epoxide obtained has a low melting point, allowing for cast polymerization at room temperature.

(a) A combination of straight-chain alkanedithiols having different carbon chain lengths: for example, a combination of 1,5-pentanedithiol and 1,6-hexanedithiol and a combination of bis(mercaptoalkyl) sulfide (for example, bis(2-mercaptoethyl) sulfide) and 1,6-hexanedithiol. (b) A combination of a straight-chain alkanedithiol and a branched alkanedithiol: for example, a combination of 1,6-hexanedithiol and 3-methyl-1,5-pentanedithiol. (c) A combination of a straight-chain alkanedithiol or branched alkanedithiol and an alkanedithiol having an alicyclic structure: for example, a combination of 1,6-hexanedithiol and 1,4-bis(mercaptomethyl)cyclohexane. (d) A combination of a straight-chain alkanedithiol or branched alkanedithiol and an alkanedithiol having a heteroatom and an alicyclic structure: for example, a combination of 1,6-hexanedithiol and 2,5-bis(mercaptomethyl)-1,4-dithiane.

When using a plurality types of polythiol compounds are used, polythiol compounds having different valences may be used; for example, tri- or higher valent polythiol compounds (that is, the polyvalent hydrocarbon group in the polythiol compound has a valence of three or more) such as a trithiol, a tetrathiol and a pentathiol may be combined with a dithiol. Since the use of a trivalent or more polythiol increases a branched and/or a crosslinked structures in a polymer, it may be preferably selected as appropriate in the light of the properties of a polythiocarbonate polythiol obtained. The amount of the trivalent or more polythiol is preferably 30 mol % or less, particularly preferably 20 mol % or less to the amount of all the polythiol compounds.

A polythiocarbonate polythiol is prepared preferably by a transesterification reaction of a carbonate compound (particularly, a diaryl carbonate) and a polythiol compound in the presence of a transesterification catalyst while continuously removing a byproduct alcohol (particularly, an aryl alcohol) from the reaction system. Here, the amount of the polythiol compound is preferably 0.8 to 3.0 fold moles, further preferably 0.85 to 2.5 fold moles, particularly preferably 0.9 to 2.5 fold moles to the carbonate compound such that all or substantially all the terminal groups in a polythiocarbonate polythiol molecular chain obtained become a mercapto group. Furthermore, the amount of the transesterification catalyst is preferably 1 to 5000 molar ppm, further preferably 10 to 1000 molar ppm to the amount of the polythiol compound. For removing a byproduct alcohol, a reactor is preferably equipped with a distilling apparatus and furthermore, the reaction may be conducted under a stream of an inert gas (for example, nitrogen, helium and argon).

In the above transesterification reaction, the diaryl carbonate is preferably diphenyl carbonate, and when using a polythiol compound in which a polyvalent hydrocarbon group is a divalent hydrocarbon group, the carbon number of the hydrocarbon group R is preferably 4 to 14. Here, the amount of the polythiol compound (particularly, a dithiol compound) containing a divalent hydrocarbon group having 4 to 14 carbons is preferably 1.05 to 3.0 fold moles, particularly preferably 1.1 to 2.5 fold moles to the amount of the diphenyl carbonate, which may result in a polythiocarbonate polythiol which is less colored (that is, an APHA is 60 or less, further 40 or less, particularly 20 or less) and in which all or substantially all the terminals in the molecular chain are a mercapto group {that is, a proportion of the aryloxy group (particularly, a phenoxy group) in the terminal groups is 5% or less, further 2% or less, particularly 1% or less}. Thus, the control of the proportion of the aryloxy group in the terminal groups enables to provide a polythiocarbonate poly(thio)epoxide in which terminal (thio)epoxy groups are contained in a high proportion, resulting in a polythiocarbonate poly(thio)ether having, in addition to excellent optical properties, excellent mechanical properties. An "APHA" refers to a hue in melt state by heating and a proportion of the aryloxy group is molar basis (the same shall apply hereinafter).

There are no particular restrictions to the conditions (temperature, pressure and time) of the above transesterification reaction as long as a target product can be efficiently produced, and for example, a carbonate compound and a polythiol compound are reacted in the presence of a transesterification catalyst, under an ambient or reduced pressure at 110 to 200° C. for about 1 to 24 hours, then under a reduced pressure at 110 to 240° C. (particularly 140 to 240° C.) for about 0.1 to 20 hours, and furthermore, at the same temperature under a reduced pressure where vacuum is gradually increased to a final pressure of 20 mmHg (2.7 kPa) or less for about 0.1 to 20 hours.

When using a plurality of polythiol compounds, although the plurality of reactants may be simultaneously reacted, a carbonate compound and one of the polythiol compounds may be first subjected to a transesterification reaction under the conditions as described above to produce a corresponding polythiocarbonate polythiol, with which another polythiol compound may be then reacted. In the latter case, when the carbonate compound is diphenyl carbonate, diphenyl carbonate and a polythiol compound (particularly, a dithiol compound) in which R has 4 to 14 carbon atoms are preferably subjected to a transesterification reaction to produce a polythiocarbonate polythiol, which is then reacted with a polythiol compound (particularly, a dithiol compound) in which R has 2 to 4 carbon atoms, to provide a target product.

There are no particular restrictions to a transesterification catalyst as long as it is a compound catalyzing the transesterification reaction; examples include basic compounds such as potassium carbonate, sodium alkoxides (for example, sodium methoxide and sodium ethoxide) and organic quaternary ammonium salts (tetraalkylammonium hydroxides such as tetrabutylammonium hydroxide); titanium compounds such as titanium tetrachloride and tetraalkoxytitaniums (for example, tetra-n-butoxytitanium and tetraisopropoxytitanium); and tin compounds such as metal tin, tin hydroxide, tin chlorides, dibutyltin laurate, dibutyltin oxide and butyltin tris(2-ethylhexanoate).

Among the transesterification catalysts, preferred are basic compounds such as potassium carbonate, sodium alkoxides (for example, sodium methoxide and sodium ethoxide) and organic quaternary ammonium salts (for example, tetraalkylammonium hydroxides such as tetrabutylammonium hydroxide); and tetraalkoxytitaniums (for example, tetra-n-butoxytitanium and tetraisopropoxytitanium). A transesterification catalyst may be any of compounds which can control the de-COS reaction described below, a tinting degree, and the amount of a remaining catalyst such that the optical and the mechanical properties of a poly(thio)carbonate poly(thio)ether can be maintained in a high level. Among others, a basic compound is particularly preferable because it can accelerate the reaction, give a lower tinting degree, that is, an APHA of 60 or less, and give a high quality polythiocarbonate polythiol in which a molar proportion (the same shall apply hereinafter) of a thioether structure (—R—S—R—, if a dithiol having a divalent hydrocarbon group R is used) formed by a de-COS reaction in the thiocarbonate structure (—S—CO—S—) is 3% or less to the total of the remaining thiocarbonate structure and the thioether structure.

Among basic compounds, an organic quaternary ammonium salt (particularly, a tetraalkylammonium hydroxide such as tetrabutylammonium hydroxide) is more preferable because it can give a polythiocarbonate polythiol having an APHA of 60 or less and a proportion of the thioether structure of 1% or less and free from a metal component. By controlling a de-COS reaction as described above, a sulfur content and a thiocarbonate structure in a polythiocarbonate polythiol can be maintained in a high level. "Remaining thiocarbonate structure" referred here means a thiocarbonate structure that has not undergone de-COS reaction.

A polythiocarbonate polythiol preferably has a number average molecular weight ($M_n$) of 250 to 2500, further 400 to 2000. If the molecular weight is out of the range, the physical properties of a polythiocarbonate poly(thio)epoxide and the optical or the mechanical properties of a polythiocarbonate poly(thio)ether are inadequate. For example, when the number average molecular weight is less than 250, a polythiocarbonate poly(thio)ether has a smaller distortion to bending failure, while when it is more than 2500, a melting point and a crystallization temperature of a polythiocarbonate poly(thio)epoxide are increased, leading to difficulty in cast molding at room temperature (40° C. or lower). Thus, the amounts of the carbonate compound and the polythiol compound are adjusted such that a desired molecular weight can be obtained, and when a number average molecular weight of a reaction product is our of the desired range For example, when a molecular weight is too small, it is transesterified while distilling the polythiol compound further, whereas when a molecular weight is too large, the polythiol compound is added for further proceeding of the transesterification reaction, to adjust the molecular weight.

After adjusting a molecular weight, if necessary, it is preferable to inactivate the remaining transesterification catalyst in the polythiocarbonate polythiol. The transesterification catalyst can be inactivated by a known method in which a phosphorous compound (for example, phosphoric acid, butyl phosphate and dibutyl phosphate) is added when a tetraalkoxytitanium is used; and an inorganic or organic acid (for example, sulfuric acid and para-toluene sulfonic acid) is added in an equimolar amount to a catalyst at 40° C. to 150° C. when a basic compound is used. When addition of an acid causes salt precipitation, the product is preferably washed with water.

A polythiocarbonate polythiol thus obtained may be washed with water to further reduce its tinting degree (APHA). For example, when the catalyst is tetraalkylammonium hydroxides a polythiocarbonate polythiol obtained already has an APHA of 60 or less, but washing with water can reduce it to 40 or less, further to 20 or less (10 or less). When the catalyst is a titanium compound, an APHA (over 100) of a polythiocarbonate polythiol can be also reduced in a similar manner. Washing with water can be conducted by dissolving a polythiocarbonate polythiol in an appropriate solvent such as methylene chloride and then, after adding a proper amount of water, mixing or stirring the mixture uniformly. This washing procedure with water may be, if necessary, repeated multiple times. Such a polythiocarbonate polythiol which has been washed with water, can be used to prepare a polythiocarbonate poly(thio)epoxide of the present invention having high quality and being less colored with an APHA of 150 or less (further 100 or less, particularly 80 or less). Furthermore, by using a basic compound or titanium compound as a transesterification catalyst, the amount of the remaining catalyst in the polythiocarbonate polythiol can be reduced to 10 ppm or less (further, 2 ppm or less) by weight (the same shall apply hereinafter) by washing with water. Controlling the amount of the remaining catalyst as described above can be also effective in maintaining the optical and the mechanical properties of a polythiocarbonate poly(thio)ether in a high level.

Epoxy-containing Halogenated Hydrocarbon Compound

An epoxy-containing halogenated hydrocarbon compound as another starting material is preferably a β-epoxypropyl halide compound, in which a halogen may be chlorine or bromine. This compound may have at least one substituent uninvolved in the reaction in its epoxy ring or α-carbon. Examples of such a substituent include aliphatic (including alicyclic) hydrocarbon groups (preferably, having 1 to 10 carbons) and aromatic (including arylaliphatic) hydrocarbon groups (preferably, having 6 to 10 carbons), whose carbon chain may contain a heteroatom (for example, a sulfur atom) or a ring structure (for example, an alicyclic structure and a saturated heterocyclic structure). Among these epoxy-containing halogenated hydrocarbon compounds, preferred are those having an aliphatic hydrocarbon group as a substituent, but those unsubstituted (i.e. β-epoxypropyl halides) are particularly preferable. As used herein, the term "uninvolved in a reaction" means that they do not participate in a reaction for synthesizing a polythiocarbonate poly(thio)epoxide or a reaction for synthesizing a polythiocarbonate poly(thio)ether.

Examples of an epoxy-containing halogenated hydrocarbon compound include epichlorohydrin, epibromohydrin, 2-mercaptomethyl-3-chloropropylene oxide and 2-mercaptomethyl-3-bromopropylene oxide.

Polythiocarbonate Polyepoxide

A polythiocarbonate polyepoxide is prepared by reacting a polythiocarbonate polythiol with an epoxy-containing halogenated hydrocarbon compound as described above. Specifically, when the polythiocarbonate polythiol is a polythiocarbonate dithiol in which all of Rs are a divalent hydrocarbon group and the epoxy-containing halogenated hydrocarbon compound is a β-epoxypropyl halide, the reaction equation can be represented as follows.

(2a)

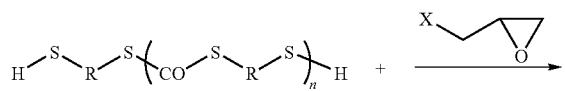

Here, the epoxy-containing halogenated hydrocarbon compound is used preferably in 1 to 30-fold molar amount, further 1 to 15-fold molar amount particularly 1 to 10-fold molar amount to the mercapto group in the polythiocarbonate polythiol, and a reaction temperature is preferably within the range of −10° C. to 100° C., further −10° C. to 60° C., particularly 0 to 40° C. There are no particular restrictions to a reaction pressure, but it is generally an ambient pressure, and there are also no particular restrictions to a reaction atmosphere.

The above reaction is preferably conducted in the presence of a base, which may be used at least in an equimolar amount preferably an equimolar to about 5-fold molar amount to the mercapto group in the polythiocarbonate polythiol. Preferable examples of the base include tertiary amines (for example, pyridine, triethylamine and diazabicycloundecene), alkali or alkaline-earth metal hydroxides (for example, sodium hydroxide, potassium hydroxide and calcium hydroxide), quaternary ammonium hydroxides (for example, tetrabutylammonium hydroxide and benzyltrimethylammonium hydroxide).

The above reaction may be conducted, if necessary, in the presence of a solvent. Any solvent may be used as long as it can dissolve the starting materials (a polythiocarbonate polythiol and an epoxy-containing halogenated hydrocarbon compound) and the base and does not interfere with the reaction; for example, water, alcohols (for example, methanol, ethanol, n-propanol, isopropanol, n-butanol and tert-butanol, ethers (for example, diethyl ether, isopropyl ether and tetrahydrofuran), aromatic hydrocarbons (for example, toluene and xylene), halogenated hydrocarbons (for example, methylene chloride, chloroform and chlorobenzene). There are no particular restrictions to the amount of the solvent as long as it does not adversely affect the process of the reaction.

Thus, a polythiocarbonate polyepoxide in which a hydrogen atom of a mercapto group in a polythiocarbonate polythiol is substituted with an epoxy-containing group can be obtained A number average molecular weight of the polythiocarbonate polyepoxide is preferably 400 to 3000, further preferably 500 to 2500. Here, when the polythiol compound to be a thiol component in a polythiocarbonate polythiol is a dithiol compound and the epoxy-containing halogenated hydrocarbon compound is a β-epoxypropyl halide, and when a substitution degree of the mercapto group is 100%, there can be obtained a polythiocarbonate polyepoxide represented by the above-mentioned general formula (2) where BP is a β-epoxypropyl group. Here, "n" is an integer of 1 or more (preferably 1 to 20) indicating a polymerization degree of the polythiocarbonate polythiol and is related to its number average molecular weight. In the polythiocarbonate polyepoxide obtained, a substitution degree of the mercapto group is adjusted by a molar ratio of the stating materials, preferably 50% or more, further preferably 70% or more, particularly preferably 90% or more.

Polythiocarbonate Polythioepoxide

A polythiocarbonate polythioepoxide is prepared by reacting a polythiocarbonate polyepoxide with a sulfating agent as described above. When a polythiocarbonate polyepoxide represented by formula (2a) is reacted with a sulfating agent, the reaction is represented by the following equation.

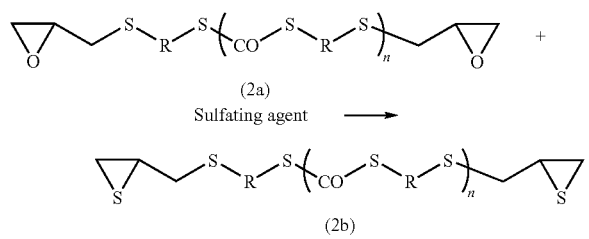

(2a)

Sulfating agent ⟶

(2b)

Here, the sulfating agent is used preferably in 0.1 to 30-fold molar amount, further in 0.5 to 10-fold molar amount, particularly 1 to 5-fold molar amount to the epoxy group in the polythiocarbonate polyepoxide; a reaction temperature is preferably within the range of 0 to 100° C., further 20 to 70° C. There are no particular restrictions to a reaction pressure, which is generally an ambient pressure; and there are also no particular restrictions to a reaction atmosphere.

Examples of the sulfating agent include alkali-metal thiocyanates (for example, sodium thiocyanate and potassium thiocyanate), thiourea, triphenylphosphine sulfide and 3-methylbenzothiazol-2-thione, among which thiourea is preferable.

The above reaction is preferably conducted in the presence of a polymerization retarder, which may used in about 0.001 to 0.5-fold molar amount, further about 0.005 to 0.2-fold molar amount to the epoxy group in the polythiocarbonate polyepoxide. Preferable examples of the polymerization retarder include inorganic acids (for example, nitric acid, hydrochloric acid, sulfuric acid, boric acid and phosphoric acid), organic acids (for example, acetic acid, thioacetic acid, propionic acid, butyric acid, oxalic acid, succinic acid, maleic acid and benzoic acid), organic peracids (for example, peracetic acid), inorganic acid anhydrides (for example, boron oxide, phosphorous pentoxide and chromic anhydride), organic acid anhydrides (for example, acetic anhydride, propionic anhydride, butyric anhydride, succinic anhydride, maleic anhydride, benzoic anhydride and phthalic anhydride), silica gel, silica-alumina and aluminum chloride, which may be used in combination of two or more.

The above reaction may be conducted, if necessary, in the presence of a solvent. Any solvent may be used as long as it can dissolve the starting materials (a polythiocarbonate polyepoxide and a sulfating agent) and does not interfere with the reaction; for example, those as used in the synthesis of a polythiocarbonate polyepoxide may be used. There are no particular restrictions to the amount of the solvent as long as it does not adversely affect the process of the reaction.

As described above, a polythiocarbonate polythioepoxide can be prepared in accordance with a polythiocarbonate polyepoxide. A number average molecular weight of the polythiocarbonate polythioepoxide is preferably 400 to 3000, further preferably 500 to 2500. Here, when the polythiol compound to be a thiol component in a polythiocarbonate polythiol is a dithiol compound, there can be obtained a polythiocarbonate polythioepoxide represented by the above-mentioned general formula (2) where EP is a β-thioepoxypropyl group. Here, "n" is an integer of 1 or more (preferably 1 to 20) indicating a polymerization degree of the polythiocarbonate polythiol and is related to its number average molecular weight. In the polythiocarbonate polythioepoxide obtained, there are no particular restrictions to a ratio of epoxy group/thioepoxy group, which is adjusted by a molar ratio of the sulfating agent used.

Polythiocarbonate Poly(thio)ether

A polythiocarbonate poly(thio)ether of the present invention having, in addition to excellent optical properties (a high refractive index and a high Abbe's number), excellent mechanical properties (a high bending distortion) and a high glass transition temperature can be obtained by a ring-opening reaction of a polythiocarbonate poly(thio)epoxide as described above, that is, polymerization of a polymerizable composition containing a polythiocarbonate poly(thio)epoxide.

The above polymerizable composition preferably contains, in addition to the polythiocarbonate poly(thio)epoxide, a compound having at least one functional group capable of reacting a (thio)epoxy group to open the ring. These compounds may be used alone or in combination of two or more, and are preferably used such that the number of moles of the functional group capable of reacting a (thio)epoxy group is 0.3 or less, further 0.2 or less, particularly 0.1 or less and 0.001 or more, further 0.003 or more, particularly 0.005 or more to the number of moles of the (thio)epoxy group.

Examples of a compound having at least one functional group capable of reacting a (thio)epoxy group to open the ring include mercapto-containing compounds (except mercapto-containing organic acids and mercapto-containing amine compounds), amine compounds, vinyl-containing compounds, organic acids or their anhydrides, mercapto-containing organic acids, mercapto-containing amine compounds and phenol compounds. Among these compounds, preferred are mercapto-containing compounds, amine compounds, mercapto-containing amine compounds and phenol compounds. Among them, aliphatic compounds are more preferred.

There are no particular restrictions to a mercapto-containing compound as long as it is a compound having at least one mercapto group capable of reacting a (thio)epoxy group to open the ring. Examples include aliphatic mercapto-containing compounds (which may include alicyclic compounds, may have a substituent and may contain a heteroatom and/or a ring structure in their carbon chain) such as methyl mercaptan, ethyl mercaptan, 1,2-ethanedithiol, 1,2-propanedithiol, 1,3-propanedithiol, 1,4-butanedithiol, 1,5-pentanedithiol, 1,6-hexanedithiol, 1,7-heptanedithiol, 1,8-octanedithiol, 1,9-nonanedithiol, 1,10-decanedithiol 1,12-dodecanedithiol, 2,2-dimethyl-1,3-propanedithiol, 3-methyl-1,5-pentanedithiol 2-methyl-1,8-octanedithiol 1,1,1-tris(mercaptomethyl)ethane, 2-ethyl-2-mercaptomethyl-1,3-propane dithiol, tetrakis(mercaptomethyl)methane, 1,4-cyclohexanedithiol, 1,4-bis(mercaptomethyl)cyclohexane, bis(2-mercaptoethyl)ether, bis(2-mercaptoethyl) sulfide, bis(2-mercaptoethyl disulfide, 2,5-bis(mercaptomethyl)-1,4-dioxane, 2,5-bis(mercaptomethyl)-1,4-dithiane, 3,3'-thiobis (propane-1,2-dithiol) and 2,2'-thiobis(propane-1,3-dithiol); and aromatic mercapto-containing compounds (which may have a substituent) such as thiophenol, 1,2-benzenedithiol, 1,3-benzenedithiol, 1,4-benzenedithiol, 1,3,5-benzenetrithiol, toluene-3,4-dithiol, mercaptomethylbenzene, 1,2-bis(mercaptomethyl)benzene, 1,3-bis(mercaptomethyl)benzene, 1,4-bis(mercaptomethylbenzene and 1,3,5-tris (mercaptomethyl)benzene. Furthermore, the above-mentioned polythiocarbonate polythiols having a number average molecular weight of 200 to 2500 may also be used. Among these mercapto-containing compounds, preferred are those having 8 or less, further 6 or less mercapto groups, which are more preferably aliphatic.

There are no particular restrictions to the amine compound as long as it is a compound having at least one amino group capable of reacting with a (thio)epoxy group to open the ring. Examples include aliphatic primary amines (which include alicyclic amines, may have a substituent and may have a ring structure in their carbon chain) such as ethylamine, propylamine, butylamine, pentylamine, hexamine, heptylamine, octylamine, decylamine, laurylamine (these include isomers), cyclopentylamine, cyclohexylamine, 2,3-dimethylcyclohexylamine, aminomethylcyclohexane, aminomethylbicycloheptane, ethylenediamine, 1,2-propylenediamine, 1,6-hexamethylenediamine, isophoronediamine, bis(4-aminocyclohexyl)methane and 2,7-diaminofluorene, aliphatic secondary amines (which include alicyclic amines, may have a substituent and may have a ring structure in their carbon chain) such as diethylamine, dipropylamine, dibutylamine (these include isomers), di(2-ethylhexyl) amine, dicyclohexylamine, piperidine, pyrrolidine, piperazine, 2-methylpiperazine, 2,5-dimethylpiperazine, 2,6-dimethylpiperazine, 1,1-di(4-piperidyl)methane, 1,2-(4-piperidyl)ethane, 1,3-(4-piperidyl)propane and 1,4-di(4-piperidyl)butane, aromatic primary amines (which may have a substituent) such as aniline, benzylamine, phenetylamine, m-(or p-)xylylenediamine, 1,5-(or 1,8-, 2,3-)diaminonaphthalene and 2,3 (or 2,6-, 3,4-)diaminopyridine, and secondary aromatic amines (which may have a substituent) such as diphenylamine, dibenzylamine, N-methylbenzylamine and N-ethylbenzylamine.

There are no particular restrictions to a vinyl-containing compound as long as it is a compound having at least one vinyl group capable of reacting with a (thio)epoxy group to open the ring. Examples include allyl compounds such as diallyl phthalate, diallyl terephthalate, diallyl carbonate, allylamine, diallylamine and N-methylallylamine; vinyl compounds such as divinylbenzene; and (meth)acrylate compounds such as benzyl (meth)acrylate, ethyleneglycol di(meth)acrylate, diethylene glycol di(meth)acrylate, neopentylglycol di(meth)acrylate, bisphenol-A di(meth)acrylate and trimethylolpropane tri(meth)acrylate. Here, a (meth) acrylate refers to an acrylate or methacrylate.

There are no particular restrictions to an organic acid or its anhydride as long as it is a compound having at least one carboxyl or acid-anhydride group capable of reacting a (thio) epoxy group to open the ring. Examples include thiodiglycolic acid, dithiodipropionic acid, phthalic anhydride, hexahydrophthalic anhydride, methylnorbornene acid anhydride, methylnorbornane acid anhydride, maleic anhydride, trimellitic anhydride and pyromellitic anhydride.

There are no particular restrictions to a mercapto-containing organic acid as long as it is a compound having at least one mercapto group and at least one carboxyl group capable of reacting with a (thio)epoxy group to open the ring. Examples include thioacetic acid, 3-mercaptopropionic acid, thioglycolic acid, thiolactic acid, thiomalic acid and thiosalicylic acid.

There are no particular restrictions to a mercapto-containing amine compound as long as it is a compound having at least one mercapto group and at least one amino group capable of reacting with a (thio)epoxy group to open the ring. Examples include aminoethyl mercaptan, 2-aminothiophenol, 3-aminothiophenol and 4-aminothiophenol.

There are no particular restrictions to a phenol compound as long as it is a compound having at least one phenolic hydroxy group capable of reacting with a (thio)epoxy group to open the ring. Examples include phenol, o-cresol, m-cresol, p-cresol, 3-methoxyphenol, catechol, resorcinol, hydroquinone and pyrogallol.

The above polymerizable composition further preferably contain a poly(thio)epoxide other than a polythiocarbonate poly(thio)epoxide, in addition to a compound having at least one functional group capable of reacting with a (thio)epoxy group to open the ring. There are no particular restrictions to this poly(thio)epoxide as long as it, when used with a polythiocarbonate poly(thio)epoxide, can provide a polythiocarbonate poly(thio)ether after a ring-opening polymerization reaction, and these can be used alone or in combination of two or more. Its amount is preferably 0.5 to 50-fold by weight, further 1 to 30-fold by weight, particularly 1.5 to 15-fold by weight to the polythiocarbonate poly(thio)epoxide.

Examples (herein, EP represents a β-(thio)epoxypropyl group) of such a poly(thio)epoxide include oxygen-containing linear aliphatic diepithio compounds such as bis(EP) ether, bis(EP-oxy)methane, 1,2-bis(EP-oxy)ethane, 1,2-bis(EP-oxy)propane, 1,3-bis(EP-oxy)propane, 1,2-bis(EP-oxymethyl)propane, 1-(EP-oxy)-2-(EP-oxymethyl)propane, 1,3-bis(EP-oxy)butane, 1,4-bis(EP-oxy)butane, 1-(EP-oxy)-3-EP-oxymethyl)butane, 1,5-bis(EP-oxy)pentane, 1-(EP-oxy)-4-(EP-oxymethyl)pentane, 1,6-bis(EP-oxy)hexane and 1-(EP-oxy)-2-(EP-oxymethyl)hexane;

sulfur-containing linear aliphatic diepithio compounds such as bis(EP)sulfide, bis(EP)disulfide, bis(EP-thio)methane, 1,2-bis(EP-thio)ethane, 1,2-bis(EP-thio)propane, 1,3-bis(EP-thio)propane, 1,3-bis(EP-thio)-2-methylpropane, 1,3-bis(EP-thio)butane, 1,4-bis(EP-thio)butane, 1,4-bis(EP-thio)-2-methylbutane, 1,5-bis(EP-thio)pentane, 1,5-bis(EP-thio)-2-methylpentane, 1,5-bis(EP-thio)-3-thiapentane, 1,6-bis(EP-thio)hexane, 1,6-bis(EP-thio)-2-methylhexane and 3,8-bis(EP-thio)-3,6-dithiaoctane;

oxygen- or sulfur-containing linear aliphatic triepithio compounds such as 1,1,1-tris(EP-oxymethyl)propane, 1,2,3-tris(EP-thio)propane, 2,2-bis(EP-thiomethyl)-1-(EP-thio) butane, 1,5-bis(EP-oxy)-2-(EP-oxymethyl)-3-thiapentane, 1,5-bis(EP-thio)-2-(EP-thiomethyl)-3-thiapentane, 1-(EP-oxy)-2,2-bis(EP-oxymethyl)-4-thiahexane, 1-(EP-thio)-2,2-bis(EP-thiomethyl)-4-thiahexane, 1,8-bis(EP-oxy)-4-(EP-oxymethyl)-3,6-dithiaoctane and 1,8-bis(EP-thio)-4-(EP-thiomethyl)-3,6-dithiaoctane oxygen- or sulfur-containing linear aliphatic tetraepithio compounds such as tetrakis(EP-oxymethyl)methane, 1,1,2,2-tetrakis[2-(EP-thio)ethylthiomethyl]ethane, 1,1,1-tris[2-(EP-thio)ethylthiomethyl]-2-(EP-thio)ethane, 2,2-bis(EP-thio)-1,3-bis(EP-thiomethyl)propane, 1,5-bis(EP-oxy)-2,4-bis(EP-oxymethyl)-3-thiapentane, 1,5-bis(EP-thio)-2,4-bis (EP-thiomethyl)-3-thiapentane, 1,5,6-tris(EP-oxy)-4-(EP-oxymethyl)-3-thiahexane, 1,8-bis(EP-oxy)-4,5-bis(EP-oxymethyl)-3,6-dithiaoctane, 1,8-bis(EP-thio)-4,5-bis(EP-thiomethyl)-3,6-dithiaoctane, 1,8-bis(EP-oxy)-4,4-bis(EP-oxymethyl)-3,6-dithiaoctane, 1,8-bis(EP-thio)-4,4-bis(EP-thiomethyl)-3,6-dithiaoctane, 1,8-bis(EP-oxy)-2,5-bis(EP-oxymethyl-3,6-dithiaoctane, 1,8-bis(EP-thio)-2,5-bis(EP-thiomethyl)-3,6-dithiaoctane, 1,9-bis(EP-oxy)-5-(EP-oxymethyl)-5-[2-(EP-oxy)ethoxymethyl]-3,7-dithianonan e, 1,10-bis(EP-oxy)-5,6-bis[2-(EP-oxy)ethoxy]-3,6,9-dithiadecane, 1,11-bis(EP-oxy) 4,8-bis(EP-oxymethyl)-3,6,9-trithiaundecane, 1,11-bis(EP-thio)-4,8-bis(EP-thiomethyl)-3,6,9-trithiaundecane, 1,11-bis(EP-oxy)-4,7-bis(EP-oxymethyl)-3,6,9-trithiaundecane, 1,11-bis(EP-thio)-4,7-bis (EP-thiomethyl)-3,6,9-trithiaundecane, 1,11-bis(EP-oxy)-5,7-bis(EP-oxymethyl)-3,6,9-trithiaundecane and 1,11-bis (EP-thio)-5,7-bis(EP-thiomethyl)-3,6,9-trithiaundecane;

oxygen- or sulfur-containing linear aliphatic pentaepithio compounds such as 1,8-bis(EP-oxy)-2,4,5-tris(EP-oxymethyl)-3,6-dithiaoctane and 1,8-bis(EP-thio)-2,4,5-tris(EP-thiomethyl)-3,6-dithiaoctane;

oxygen- or sulfur-containing cyclic aliphatic polyepithio compounds such as 1,3-bis(EP-oxy)cyclohexane, 1,3-bis(EP-thio)cyclohexane, 1,4-bis(EP-oxy)cyclohexane, 1,4-bis(EP-thio)cyclohexane, 1,3-bis(EP-oxymethyl) cyclohexane, 1,3-bis(EP-thiomethyl)cyclohexane, 1,4-bis(EP-oxymethyl) cyclohexane, 1,4-bis(EP-thiomethyl)cyclohexane, bis[4-(EP-oxy)cyclohexyl]methane, 2,2-bis[4-(EP-oxy)cyclohexyl]propane and bis[4-(EP-oxy)cyclohexyl]sulfide;

heterocycle-containing cyclic aliphatic polyepithio compounds such as 2,5-bis(EP-oxymethyl)-1,4-dithiane, 2,5-bis(EP-thiomethyl)-1,4-dithiane, 2,5-bis(EP-oxyethyloxymethyl)-1,4-dithiane and 2,5-bis[2-(EP-thio)ethylthiomethyl]-1,4-dithiane; and aromatic polyepithio compounds such as 1,3-bis(EP-oxy)benzene, 1,4-bis(EP-oxy)benzene, 1,3-bis(EP-oxymethyl)benzene, 1,4-bis(EP-oxymethyl)benzene, 1,3-bis(EP-thio)benzene, 1,4-bis(EP-thio)benzene, 1,3-bis(EP-thiomethyl)benzene, 1,4-bis(EP-thiomethyl)benzene, bis[4-(EP-thio)phenyl]methane, 2,2-bis[4-(EP-thio)phenyl]propane, 4,4'-bis(EP-thio)biphenyl and bis[4-(EP-thio)phenyl]sulfone.

Furthermore, the above polyepithio compound may be a mercapto-containing epithio compound such as 3-mercaptopropylene sulfide and 4-mercaptobutene sulfide. Among these polyepithio compounds, various linear or cyclic aliphatic polyepithio compounds as described above are preferable.

A polymerizable composition of the present invention contains a polythiocarbonate poly(thio)epoxide as described above, preferably contains a compound having at least one functional group capable of reacting a (thio)epoxy group to open the ring, and more preferably, further contains a poly(thio)epoxide other than a polythiocarbonate poly(thio)epoxide. It may furthermore contain a variety of known additives such as an internal mold release, a light stabilizer, an ultraviolet absorber, an antioxidant, a painting and a filer depending on its utility within the limits in which the effects of the present invention are not deteriorated.

The ring-opening polymerization reaction of a polythiocarbonate poly(thio)epoxide can be conducted, for example, by mixing the above polymerizable composition in the presence or absence of a catalyst at −100 to 120° C., preferably 10 to 80° C., more preferably 0 to 50° C. for 0.1 to 72 hours for pre-polymerization, injecting the mixture into a glass or metal mold and heating it by gradual temperature rise from 10 to 200° C., preferably from 10 to 160° C., more preferably from 10 to 130° C. over 6 to 72 hours. There are no particular restrictions to a reaction pressure which is generally an ambient pressure and there are no particular restrictions to a reaction atmosphere. A catalyst may be, if necessary, used as long as the ring-opening polymerization reaction can be controlled, and its amount may be, for example, 5% by weight or less (furthermore, 1% by weight or less) to the amount of the polymerizable composition.

Here, the components other than a polythiocarbonate poly(thio)epoxide in the polymerizable composition may be pre-mixed or mixed stepwise in the course of the reaction. For example, first a polythiocarbonate poly(thio)epoxide and a mercapto-containing compound may be pre-polymerized before adding and mixing the other components.

Examples of the catalyst include amines, phosphines, organic quaternary ammonium salts, organic quaternary phosphonium salts, tertiary sulfonium salts, secondary iodonium salts, mineral acids, Lewis acids, organic acids, silic acids and tetrafluoroboric acids. Among these, in the light of controllability of the polymerization reaction, preferred are tertiary amines such as triethylamine, tributylamine, N,N-dimethylcyclohexylamine and N,N-dicyclohexylmethylamine; tertiary phosphines such as trimethylphosphine, triethylphosphine, tributylphosphine, tricyclohexylphosphine and triphenylphosphine; organic quaternary ammonium halides such as tetramethylammonium chloride, tetramethylammonium bromide, tetra-n-butylammonium chloride and tetra-n-butylammonium bromide; and organic quaternary phosphonium halides such as tetramethylphosphonium chloride, tetramethylphosphonium bromide, tetra-n-butylphosphonium chloride and tetra-n-butylammonium bromide.

EXAMPLES

There will be specifically described the present invention with reference to Examples. The physical properties of polythiocarbonate polythiols, polythiocarbonate poly(thio)epoxides, polythiocarbonate poly(thio)ethers were determined by the following methods, respectively.

Physical Properties of a Polythiocarbonate Polythiol (1) Mercapto value (SH value; mg KOH/g): In a 100 mL sample bottle was weighed out a sample (the weight was precisely read to four places of decimals in gram), to which were precisely added 5 mL of an acetic anhiydride-tetahydrofuran solution (containing 4 g of acetic anhydride in 100 mL of the solution) and 10 mL of a 4-dimethylaminopyridine-tetrahydrofuran solution (containing 1 g of 4-dimethylaminopyridine in 100 mL of the solution), and after completely dissolving the sample, the mixture was left at room temperature for one hour, 1 mL of ultrapure water was precisely added, the mixture was left at room temperature for 30 min while being sometimes stirred, and the mixture was titrated with a 0.25M solution of potassium hydroxide-ethanol (indicator: phenolphthalein). An SH value was calculated using the following equation.

$$SH\ value(mg\ KOH/g) = 14.025 \times (B-A) \times f/S$$

wherein S represents a sample weight(g); A represents the amount (mL) of the 0.25M solution of potassium hydroxide-ethanol required for titrating the sample; B represents the amount (mL) of the 0.25M solution of potassium hydroxide-ethanol required for a blank test; and f represents a actor of the 0.25M solution of potassium hydroxide-ethanol.

(2) Number average molecular weight ($M_n$): calculated by the following equation.

$$M_n = 112200/SH\ value$$

(3) Acid value (mg KOH/g): a sample was dissolved in 200 mL of a toluene-ethanol solution (equivolumne mixture solution) and the mixture was titrated with a 0.1M potassium hydroxide-ethanol solution (indicator: phenolphthalein). An acid value was calculated using the following equation:

$$Acid\ value(mg\ KOH/g) = 5.61(C-D)f'/S'$$

wherein S' represents a sample weight (g); C represents the amount (mL) of the 0.1M potassium hydroxide-ethanol solution required for titrating the sample; D represents the amount (mL) of the 0.1M potassium hydroxide-ethanol solution required for a blank test; and f' represents a factor of the 0.1M potassium hydroxide-ethanol solution.

(4) Melting point and crystallization temperature: Determined using a differential scanning calorimeter (Shimadzu Corporation; DSC-50) under a nitrogen gas atmosphere over the temperature range of −100 to 100° C. with a temperature-increase and a temperature-decrease rates of 10° C./min.

(5) Viscosity (mPa·sec): Determined using a type E rotational viscometer (Broodkfield Inc.; programmable digital viscometer DV-II+) at 35° C.

(6) Hue (APHA: Determined in accordance with JIS-K1557.

(7) Proportion of aryloxy groups in terminal groups (%): A proportion (molar proportion) of phenoxy groups to the total terminal groups was determined from an integration value of $^1$H-NMR.

(8) Proportion of a thioether structure formed by a de-COS reaction (%): The total amount (molar amount) of a residual thiocarbonate structure and a thioether structure formed after the de-COS reaction was determined from an integration value of $^1$H-NMR, and then a proportion (molar proportion) of the thioether structure to the total amount was determined.

(9) Remaining catalyst amount (ppm; by weight): 30% by weight solution of a polythiocarbonate polythiol in chloroform was prepared, and tetrabutylammonium hydroxide in the solution was extracted with water in the same volume and measured by high performance liquid chromatography.

Physical Properties of a Polythiocarbonate Poly(thio)epoxide (1) Number average molecular weight ($M_n$): calculated by the following equation:

$$M_n = 112200/SH \text{ value of a polythiocarbonate polythiol} + (E-2)F(1-H) + (G-2)FH$$

wherein E represents molecular weight of an epoxy-containing group in polythiocarbonate polyepoxide; F represents conversion ratio of mercapto group in polythiocarbonate polythiol; G represents molecular weight of thioepoxy-containing group in polythiocarbonate polythioepoxide; and H represents conversion ratio of epoxy group in polythiocarbonate polyepoxide.

(2) Melting point and crystallization temperature: Determined using a differential scanning calorimeter (Shimadzu Corporation; DSC-50) under a nitrogen gas atmosphere over the temperature range of −100 to 100° C. with a temperature-increase and a temperature-decrease rates of 10° C./min.

(3) Viscosity (mPa·sec): Determined using a type E rotational viscometer (Brookfield Inc.; programmable digital viscometer DV-II+) at 60° C.

(4) Hue (APHA): Determined in accordance with JIS-K1557.

Physical Properties of a Polythiocarbonate Poly(thio)ether (1) Refractive index: Using a refractometer (ATAGO Co., Ltd., Abbe refractometer; MR-04), a refractive index was measured under e-beam ($\lambda$=546 nm) radiation.

(2) Abbe's number ($v_e$): Using the above refractometer, refractive indices ($n_e$, $n_F$, $n_{C'}$) were measured under e-beam ($\lambda$=546 nm), F'-beam ($\lambda$=480 nm) and C'-beam ($\lambda$=644 nm), respectively and then an Abbe's number was calculated using the following equation.

$$v_e(n_e-1)/(n_F-n_{C'})$$

(3) Glass transition temperature ($T_g$): Determined under a nitrogen gas atmosphere over a temperature range of −100° C. to 250° C. with a temperature-increase and a temperature-decrease rates of 10° C./min using a differential scanning calorimeter (Perkin Ebner; PYRIS Diamond DSC).

(4) Bending properties: A flexural modulus, a flexural strength and a distortion to bending failure were determined from the measurements at 23° C. and 50% RH using a testing machine for three point bending (Orientec Co., Ltd.; Tensiron UCT-5T) in accordance with JIS-K7171. A test piece had a size of 25 mm (width)×40 mm (length)×1 mm (thickness); a distance between supporting tables was 32 mm, and radii of an indenter and a supporting table were 5.0 mm and 2.0 mm, respectively.

Reference Example 1

Preparation of a Polythiocarbonate Polythiol

In 500 mL (milliliter) glass reactor equipped with a stirrer, a thermometer and a distillation column (having a fractionating column, a reflux head and a condenser in the column head), were fed 90.1 g (0.599 mol) of 1,6-hexanedithiol, 77.2 g (0.500 mob) of bis(2-mercaptoethyl) sulfide, 155 g (0.725 mol) of diphenyl carbonate and 0.861 g (0.332 mmol) of a 10% by weight tetrabutylammonium hydroxide-methanol solution, and the mixture was maintained under reflux at 200 mmHg (27 kPa) and 160° C. for one hour. Then, the system was gradually vacuumed to 50 mmHg (6.7 kPa) over 8 hours while evaporating phenol, and when phenol was no longer distilled, a pressure was gradually reduced from 30 mmHg (4.0 kPa) to 15 mmHg (2.0 kPa) over 3 hours to react the mixture, while distilling phenol. Thus, a desired polythiocarbonate polythiol was obtained.

To the polythiocarbonate polythiol was added p-toluenesulfonic acid monohydrate in an equimolar to the above catalyst, and the mixture was stirred at 130° C. for 2 hours to inactivate the catalyst. Then, to the mixture was added 430 g of methylene chloride to dissolve the polythiocarbonate polythiol, and the resulting solution was washed with water in the same volume three times and dried over anhydrous magnesium sulfate, and the solid was removed by filtration and methylene chloride was evaporated. Physical properties of the polythiocarbonate polythiol (a) thus obtained was a liquid at a low temperature having a melting point of 9.7° C. Its physical properties and the $^1$H-NMR spectrometry results are as follows.

SH value: 211.4 (mg KOH/g), number average molecular weight: 531, acid value: 0.04 (mg KOH/g), viscosity: 248 (mPa·sec), melting point: 9.7° C., crystallization temperature: −19.8° C., APHA: 10, terminal aryloxy group: less than 1%, thioether structure: less than 1%, remaining catalyst: less than 2 ppm δ (ppm): 1.33 (t, J=7.3 Hz, SH), 1.39 (m, CH$_2$), 1.62 (m, CH$_2$), 1.74 (m, SH), 2.52 (m, CH$_2$SH), 2.78 (m, CH$_2$SCH$_2$ and CH$_2$SCH), 2.97 (m, CH$_2$S$\overline{CO}$), 3.19 (m, CH$_2$SCO)

Example 1

Preparation of a Polythiocarbonate Polyepoxide

In a 500 mL (internal volume) glass reactor equipped with a stirrer, a thermometer and a reflux condenser, 50.0 g (94.2 mmol) of polythiocarbonate polythiol (a) was dissolved in a mixed solution of 230 mL of methylene chloride and 60 mL of tert-butanol, and to the mixture was added 3.82 g (9.14 mmol) of a 40% by weight aqueous solution of benzyltrimethylammonium hydroxide at room temperature. Then, after adding dropwise 21.8 g (236 mmol) of epichlorohydrine at 30° C. or lower over 1 hour, 23.4 g (234 mmol) of a 40% by weight aqueous solution of sodium hydroxide was added dropwise at 15 to 25° C. over 1 hour, and the mixture was stirred at room temperature for 5 hours. To the resulting reaction solution was added 200 mL of water and the organic phase was separated and the aqueous phase was extracted with 200 mL of methylene chloride. These two organic phases were combined, washed with water (400 mL×3) and dried (anhydrous magnesium sulfate), and after removing a solid (filtration) and evaporating the solvent (distillation in vacuo), 59.3 g of a colorless waxy solid was obtained. The physical properties of polythiocarbonate polyepoxide (A) thus obtained are shown in Table 1 and the $^1$H-NMR spectrometry results are as follows.

δ (ppm): 1.39 (m, CH$_2$), 1.62 (m, CH$_2$), 2.60 (m, CH$_2$O), 2.70 (d, 7.2 Hz, SC$\underline{H}_2$CH), 2.74 (d, 7.2 Hz, SC$\underline{H}_2$CH), 2.78 (m, CH$_2$SCH$_2$, C$\underline{H}$), 2.97 (m, CO$_2$SCO), 3.17 (m, CH$_2$SCO)

Example 2

Preparation of a Polythiocarbonate Polyether

In a 30 mL (internal volume) glass reactor equipped with a stirring bar, 0.674 g (1.05 mmol) of polythiocarbonate polyepoxide CA) and 0.233 g (0.439 mmol) of polythiocarbonate polythiol (a) were dissolved in 8.11 g (50.0 mmol) of bis(β-thioepoxypropyl) ether at 25° C., and after adding 0.034 g of N,N-dimethylcyclohexylamine at this temperature, the mixture was reacted for 2 hours.

After completion of the reaction, the reaction solution was poured into a mold where a silicon rubber spacer with a thickness of 1 mm was sandwiched between two glass plates, and was left at 25° C. for 12 hours and then warmed from 30° C. to 100° C. over 27 hours. The polymer thus prepared (referred to as polyether (I)) was removed from the mold, and cut into a piece with a predetermined size, which was measured for optical and mechanical properties. The composition of the polymerizable composition and the physical properties of polyether (I) were shown in Tables 2 and 3, respectively. Here, bis(β-thioepoxypropyl)ether was prepared as described in Japanese published unexamined application 2000-336087, from bis(β-epoxypropyl) ether produced using 3-epoxypropyloxypropene as a starting material as described in European Journal of Organic Chemistry, 2001, 875.

Example 3

Preparation of a Polythiocarbonate Polyether

A polymer (referred to as polyether (II)) was prepared as described in Example 2, except that 1.08 g (1.68 mmol) of polythiocarbonate polyepoxide (A) and 0.234 g (0.441 mmol) of polythiocarbonate polythiol (a) were completely dissolved in 7.69 g (47.4 mmol) of bis(β-thioepoxypropyl) ether at 25° C. and at this temperature, 0.033 g of N,N-dimethylcyclohexylamine was added. The composition of the polymerizable composition and the physical properties of polyether (II) are shown in Tables 2 and 3, respectively.

Example 4

Preparation of a Polythiocarbonate Polyether

A polymer (referred to as polyether (III)) was prepared as described in Example 2, except that 2.64 g (4.09 mmol) of polythiocarbonate polyepoxide (A) and 0.234 g (0.441 mmol) of polythiocarbonate polythiol (a) were completely dissolved in 6.14 g (37.8 mmol) of bis(β-thioepoxypropyl) ether at 25° C. and at this temperature, 0.033 g of N,N-dimethylcyclohexylamine was added. The composition of the polymerizable composition and the physical properties of polyether (III) are shown in Tables 2 and 3, respectively.

Example 5

Preparation of a Polythiocarbonate Polythioepoxide

In a one-liter (internal volume) glass reactor equipped with a stirrer, a thermometer and a reflux condenser, 59.0 g (91.9 mmol) of polythiocarbonate polyepoxide (A) was dissolved in a mixed solution of 250 ml of tetrahydrofuran and 60 mL of tert-butyl alcohol, and after adding 21.0 g (276 mmol) of thiourea and 0.920 g (9.02 mmol) of acetic anhydride, the mixture was stirred at 50° C. for 24 hours (these procedures were conducted under a nitrogen stream). To the resulting reaction solution were added 300 mL of water and 400 mL of chloroform, and the organic phase was separated, washed with an acid (100 mL of a 1% by weight aqueous solution of sulfuric acid) and water (370 mL×3) and dried (anhydrous sodium sulfate), and then a solid was removed (filtration) and the solvent was evaporated (distillation in vacuo) to give 57.4 g of a colorless waxy solid. The physical properties of polythiocarbonate polythioepoxide (B) thus obtained are shown in Table 1 and the $^1$H-NMR spectrometry results are as follows.

δ (ppm): 1.39 (m, CH$_2$), 1.62 (m, CH$_2$), 2.25 (dd, 2.0 Hz and 7.2 Hz, CHC$\underline{H}_2$S), 2.60 to 3.40 (m, CH$_2$SCH$_2$, CH$_2$SCO, CHC$\underline{H}_2$S and C$\underline{H}$)

Example 6

Preparation of a Polythiocarbonate Polythioether

A polymer (referred to as polythioether (IV)) was prepared as described in Example 2, except that 0.645 g (0.952 mmol) of polythiocarbonate polythioepoxide (B) and 0.250 g (0.471 mmol) of polythiocarbonate polythiol (a) were completely dissolved in 8.12 g (50.1 mmol) of bis(β-thioepoxypropyl) ether at 25° C. and at this temperature, 0.034 g of N,N-dimethylcyclohexylamine was added. The composition of the polymerizable composition and the physical properties of polythioether (IV) are shown in Tables 2 and 3, respectively.

Example 7

Preparation of a Polythiocarbonate Polythioether

A polymer (referred to as polythioether (V)) was prepared as described in Example 2, except that 1.06 g (1.57 mmol) of polythiocarbonate polythioepoxide (B) and 0.234 g (0.441 mmol) of polythiocarbonate polythiol (a) were completely dissolved in 7.70 g (47.4 mmol) of bis(β-thioepoxypropyl ether at 25° C. and at this temperature, 0.034 g of N,N-dimethylcyclohexylamine was added. The composition of the polymerizable composition and the physical properties of polythioether (V) are shown in Tables 2 and 3, respectively.

Example 8

Preparation of a Polythiocarbonate Polythioether

A polymer (referred to as polythioether (VI)) was prepared as described in Example 2, except that 2.62 g (3.87 mmol) of polythiocarbonate polythioepoxide dB) and 0.248 g (0.467 mmol) of polythiocarbonate polythiol (a) were completely dissolved in 6.20 g (38.2 mmol) of bis(β-thioepoxypropyl) ether at 25° C. and at this temperature, 0.034 g of N,N-dimethylcyclohexylamine was added. The composition of the polymerizable composition and the physical properties of polythioether (VI) are shown in Tables 2 and 3, respectively.

Comparative Example 1

Preparation of a Polythioether

A polymer (referred to as polythioether (VII)) was prepared as described in Example 2, except that 0.286 g (1.85 mmol) of bis(2-mercaptoethyl) sulfide was completely dissolved in 8.77 g (54.1 mmol) of bis(β-epithiopropyl)ether at 25° C. and at this temperature, 0.0087 g of N,N-dimethylcyclohexylamine was added. The composition of the polymerizable composition and the physical properties of polythioether (VII) are shown in Tables 2 and 3, respectively.

Comparative Example 2

Preparation of a Polythioether

A polymer (referred to as polythioether (VIII)) was prepared as described in Example 2, except that 0.934 g (6.05 mmol) of bis(2-mercaptoethyl) sulfide was completely dissolved in 8.30 g (51.2 mmol) of bis(β-thioepoxypropyl) ether at 25° C. and at this temperature, 0.0346 g of N,N-dimethylcyclohexylamine was added. The composition of the polymerizable composition and the physical properties of polythioether (VIII) are shown in Tables 2 and 3, respectively.

Comparative Example 3

Preparation of a Polythioether

A polymer (referred to as polythioether (IX)) was prepared as described in Example 2, except that 1.09 g (4.27 mmol) of bis(thioepoxypropyl) trithiocarbonate and 0.305 g (1.97 mmol) of bis(2-mercaptomethyl) sulfide were completely dissolved in 7.62 g (47.0 mmol) of bis(β-thioepoxypropyl) ether at 25° C. and at this temperature, 0.033 g of N,N-dimethylcyclohexylamine was added. The composition of the polymerizable composition and the physical properties of polythioether (IX) are shown in Tables 2 and 3, respectively. Here, bis(thioepoxypropyl) trithiocarbonate was synthesized as described in Patent document 3 and had a number average molecular weight of 255 and an APHA of over 500.

Example 9

Preparation of a Polythiocarbonate Polythioether

A polymer (referred to as polythioether (X)) was prepared as described in Example 1, except that 1.20 g (1.78 mmol) of polythiocarbonate polythioepoxide (B) and 0.100 g (0.648 mmol) of bis(2-mercaptoethyl) sulfide were completely dissolved in 8.70 g (53.6 mmol) of bis(β-thioepoxypropyl) ether at 25° C. and at this temperature, 0.034 g of N,N-dimethylcyclohexylamine was added. The composition of the polymerizable composition and the physical properties of polythioether (X) are shown in Tables 2 and 3, respectively.

Reference Example 2

Preparation of a Polythiocarbonate Polythiol

In a reactor as described in Reference Example 1 were fed 81.9 g (0.530 mol) of bis(2-mercaptoethyl) sulfide, 84.7 g (0.563 mol) of 3-methyl-1,5-pentanedithiol, 153 g (0.715 mol) of diphenylcarbonate and 0.859 g (0.331 mmol) of a 10% by weight tetrabutylammonium hydroxide-methanol solution, and then the resulting mixed solution was treated as described in Reference Example 1 to react the mixture while distilling a mixture of phenol, bis(2-mercaptoethyl) sulfide and 3-methyl-1,5-pentanedithiol. Thus, a desired polythiocarbonate polythiol was obtained.

Then, inactivation of the catalyst, addition of methylene chloride, washing with water, drying, filtration and evaporation of methylene chloride were conducted as described in Reference Example 1. The physical properties of the end-product polythiocarbonate polythiol (b) and the $^1$H-NMR spectrometry results are as follows.

SH value: 155.4 (mg KOH/g), number average molecular weight: 722, acid value: 0.05 (mg KOH/g), viscosity: 346 (mPa-sec), melting point: none, crystallization temperature: none, APHA: 10, terminal aryloxy group: less than 1%, thioether structure: less than 1%, remaining catalyst: less than 2 ppm δ (ppm): 0.92 (d, J=6.3 Hz, CH$_3$), 0.95 (d, J=6.3 Hz, CH$_3$), 1.33 (t, 7.5 Hz, SH), 1.48 (m, CH), 1.63 (m, CH$_2$), 1.75 (t, 7.5 Hz, SH), 2.53 (m, C$\underline{H_2}$SH), 2.78 (m, CH$_2$SCH$_2$ and C$\underline{H_2}$SH), 2.98 (m, CH$_2$SC$\overline{O}$), 3.18 (m, CH$_2$SCO)

Example 10

Preparation of a Polythiocarbonate Polyepoxide

In a reactor as described in Example 1, 50.0 g (69.3 mmol) of polythiocarbonate polythiol (b) was dissolved in a mixed solution of 230 mL of methylene chloride and 60 mL of tert-butanol, and 2.81 g (6.72 mmol) of a 40% by weight aqueous benzyltrimethylammonium hydroxide solution was added at room temperature. Then, after adding dropwise 16.0 g (174 mmol) of epichlorohydrin at 30° C. or less over one hour, 17.2 g (172 mmol) of a 40% by weight aqueous sodium hydroxide solution was added dropwise at 15 to 25° C. over one hour, and then the mixture was treated as described in Example 1. The physical properties of polythiocarbonate polyepoxide (C) thus obtained are shown in Table 1 and the $^1$H-NMR spectrometry results are as follows.

δ (ppm): 0.95 (d, J=6.0 Hz, CH$_3$), 1.48 (m, CH), 1.63 (m, CH$_2$), 2.60 (m, CH$_2$O), 2.70 (d, 7.2 Hz, SCH$_2$CH), 2.74 (d, 7.2 Hz, SCH$_2$CH), 2.78 (m, CH$_2$SCH$_2$), 2.$\overline{98}$ (m, CH$_2$SCO), 3.18 (m, C$\overline{H_2}$SCO)

Example 11

Preparation of a Polythiocarbonate Polyether

A polymer (referred to as polyether (XI)) was prepared as described in Example 1, except that 1.08 g (1.29 mmol) of polythiocarbonate polyepoxide (C) and 0.234 g (0.324 mmol) of polythiocarbonate polythiol (b) were completely dissolved in 7.69 g (47.4 mmol) of bis(β-thioepoxypropyl) ether at 25° C. and at this temperature, 0.034 g of N,N-dimethylcyclohexylamine was added. The composition of the polymerizable composition and the physical properties of polyether (XI) are shown in Tables 2 and 3, respectively.

Example 12

Preparation of a Polythiocarbonate Polythioepoxide

Polythiocarbonate polythioepoxide (D) was prepared as described in Example 5, except that in a reactor as described in Example 5, 50.0 g (60.0 mmol) of polythiocarbonate polyepoxide (C) was dissolved in a mixed solution of 250 mL of tetrahydrofuran and 60 mL of tert-butyl alcohol and 13.7 g (180 mmol) of thiourea and 0.601 g (5.89 mmol) of acetic anhydride were added. The physical properties of polythiocarbonate polythioepoxide (D) thus obtained are shown in Table 1 and the $^1$H-NMR spectrometry results are as follows.

δ (ppm): 0.95 (d, J=6.0 Hz, CH$_3$), 1.48 (m, CH), 1.63 (m, CH$_2$), 2.25 (dd, 2.0 Hz, 7.2 Hz, CHCH$_2$S), 2.60 to 3.40 (m, CH$_2$SCH$_2$, CH$_2$SCO, CHC$\underline{H_2}$S and C$\overline{H}$)

Example 13

Preparation of a Polythiocarbonate Polythioether

A polymer (referred to as polythioether (XII)) was prepared as described in Example 1, except that 1.08 g (1.25 mmol) of polythiocarbonate polythioepoxide (D) and 0.234 g (0.324 mmol) of polythiocarbonate polythiol (b) were completely dissolved in 7.70 g (47.4 mmol) of bis(β-thioepoxypropyl)ether at 25° C. and at this temperature, 0.033 g of N,N-dimethylcyclohexylamine was added. The composition of the polymerizable composition and the physical properties of polythioether (XII) are shown in Tables 2 and 3, respectively.

TABLE 1

| Polythiocarbonate poly(thio)epoxide | | Number average molecular weight | Melting point (° C.) | Crystallization temperature (° C.) | Viscosity (mPa·sec) | Hue (APHA) |
|---|---|---|---|---|---|---|
| Example 1 | A | 643 | 45.6 | 16.6 | 358 | 10 |
| Example 5 | B | 675 | 51.0 | 22.2 | 2740 | 60 |
| Example 10 | C | 834 | — | — | 501 | 10 |
| Example 12 | D | 866 | — | — | 3310 | 60 |

Note:
"—" indicates that in the range of −100° C. to 100° C., melting or crystallization does not occur at a temperature-increase and a temperature-decrease rates of 10° C./min.

TABLE 2

| | Polymerizable composition | | |
|---|---|---|---|
| | Polythiocarbonate poly(thio)epoxide | Polythiol | Polythioepoxide |
| Example 2 | A (7.5) | a (2.6) | ETPE (90) |
| Example 3 | A (12) | a (2.6) | ETPE (85) |
| Example 4 | A (29) | a (2.6) | ETPE (68) |
| Example 6 | B (7.1) | a (2.8) | ETPE (90) |
| Example 7 | B (12) | a (2.6) | ETPE (86) |
| Example 8 | B (29) | a (2.6) | ETPE (68) |
| Comparative Example 1 | — | MES (3.2) | ETPE (97) |
| Comparative Example 2 | — | MES (10) | ETPE (90) |
| Comparative Example 3 | — | MES (3.4) | ETPE (85) BEPTC (12) |
| Example 9 | B (12) | MES (1) | ETPE (87) |
| Example 11 | C (12) | b (2.6) | ETPE (85) |
| Example 13 | D (12) | b (2.6) | ETPE (85) | a: Polythiocarbonate polythiol (a)
b: Polythiocarbonate polythiol (b)
MES: Bis(2-mercaptoethyl) sulfide
ETPE: Bis(β-thioepoxypropyl) ether
BEPTC: Bis(β-thioepoxypropyl) trithiocarbonate
A figure in parentheses represents a proportion of a composition component (% by weight).

TABLE 3

| | Optical properties | | Elasticity modulus (MPa) | Flexural properties | | Tg (° C.) |
|---|---|---|---|---|---|---|
| | Refractive index | Abbe's number | | Flexural strength (MPa) | Distortion to bending failure (%) | |
| Example 2 | 1.656 | 40.0 | 2855 | 74.70 | 3.70 | 86.6 |
| Example 3 | 1.653 | 39.8 | 2528 | 68.23 | 4.25 | 85.9 |
| Example 4 | 1.645 | 41.3 | 1143 | 32.37 | 4.81 | 84.5 |
| Example 6 | 1.660 | 38.4 | 3167 | 77.30 | 3.01 | 85.9 |
| Example 7 | 1.658 | 42.2 | 2863 | 73.31 | 3.86 | 81.4 |
| Example 8 | 1.654 | 39.2 | 1603 | 42.66 | 5.51 | 81.8 |
| Comparative Example 1 | 1.657 | 37.1 | 3399 | 73.73 | 2.75 | 90.5 |
| Comparative Example 2 | 1.657 | 38.0 | 2870 | 72.62 | 3.86 | 66.7 |
| Comparative Example 3 | 1.663 | 38.1 | 3499 | 74.89 | 2.76 | 88.9 |
| Example 9 | 1.659 | 40.2 | 3012 | 75.51 | 3.49 | 84.2 |
| Example 11 | 1.653 | 40.1 | 2519 | 68.36 | 4.31 | 85.9 |
| Example 13 | 1.658 | 40.5 | 2858 | 73.68 | 3.92 | 82.7 |

Industrial Applicability

A polythiocarbonate poly(thio)epoxide of the present invention is very useful as a starting material for an optical resin. A resin (polythiocarbonate poly(thio)ether), provided therefrom, has, in addition to excellent optical properties (a high refractive index and a high Abbe's number), excellent mechanical properties (a high bending distortion) and a high glass transition temperature, which can be suitably used for, for example, a plastic lens, a prism, an optical fiber, an information storage substrate, a color filter and an infrared absorbing filter.

The invention claimed is:

1. A polythiocarbonate poly(thio)epoxide wherein a hydrogen atom of a mercapto group in a polythiocarbonate polythiol is substituted with a (thio)epoxy-containing group.

2. The polythiocarbonate poly(thio)epoxide as claimed in claim 1, wherein said (thio)epoxy-containing group is a β-(thio)epoxypropyl group.

3. The polythiocarbonate poly(thio)epoxide as claimed in claim 1, comprising a repeating unit represented by general formula (1):

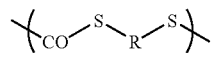

(1)

wherein R is a divalent hydrocarbon group which may optionally have a substituent uninvolved in the reaction and whose carbon chain may optionally have an atom or atomic group uninvolved in the reaction.

4. The polythiocarbonate poly(thio)epoxide as claimed in claim 3, represented by general formula (2):

(2)

wherein EP represents a β-(thio)epoxypropyl group and n represents an integer of 1 or more.

5. The polythiocarbonate poly(thio)epoxide as claimed in claim 3, comprising at least two types of the repeating units represented by general formula (1).

6. The polythiocarbonate poly(thio)epoxide as claimed in claim 1, having a number average molecular weight of 400 to 3000.

7. The polythiocarbonate poly(thio)epoxide as claimed in claim 1, having an American Public Health Association (APHA) color index of 150 or less.

8. A process for manufacturing a polythiocarbonate polyepoxide wherein a hydrogen atom of a mercapto group in a polythiocarbonate polythiol is substituted with an epoxy-containing group; the process comprising a step of reacting a polythiocarbonate polythiol with an epoxy-containing halogenated hydrocarbon compound.

9. The process for manufacturing a polythiocarbonate polyepoxide as claimed in claim 8, wherein said epoxy-containing halogenated hydrocarbon compound is a β-epoxypropyl halide compound.

10. A process for manufacturing a polythiocarbonate polythioepoxide wherein a hydrogen atom of a mercapto group in a polythiocarbonate polythiol is substituted with a thioepoxy-containing group; the process comprising a step of reacting a polythiocarbonate polyepoxide in which a hydrogen atom of a mercapto group in a polythiocarbonate polythiol is substituted with an epoxy-containing group with a sulfating agent.

11. A polymerizable composition comprising the polythiocarbonate poly(thio)epoxide as claimed in claim 1.

12. The polymerizable composition as claimed in claim 11, comprising a compound having a functional group capable of reacting a (thio)epoxy group to open the ring.

13. The polymerizable composition as claimed in claim 12, wherein said compound having a functional group capable of reacting a (thio)epoxy group to open the ring is a mercapto-containing compound.

14. The polymerizable composition as claimed in claim 11, further comprising a poly(thio)epoxide compound other than said polythiocarbonate poly(thio)epoxide.

15. A polymer prepared by polymerizing the polymerizable composition as claimed in claim 11.

16. An optical material comprising the polymer as claimed in claim 15.

* * * * *